US006385982B1

United States Patent
Ota et al.

(10) Patent No.: US 6,385,982 B1
(45) Date of Patent: May 14, 2002

(54) AIR CONDITIONING APPARATUS

(75) Inventors: Masaki Ota; Ken Suitou; Ryo Matsubara; Taku Adaniya, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/714,603

(22) Filed: Nov. 16, 2000

(30) Foreign Application Priority Data

Nov. 17, 1999 (JP) .......................... 11-326880

(51) Int. Cl.⁷ .............. F25B 1/00; F25B 41/00
(52) U.S. Cl. .............. 62/209; 62/228.3; 62/229
(58) Field of Search ............ 62/229, 209, 228.3, 62/228.5; 417/222.2

(56) References Cited

U.S. PATENT DOCUMENTS 6,321,545 B1 * 11/2001 Ota et al. .................. 62/133

FOREIGN PATENT DOCUMENTS

| JP | 4061801 155 | * 6/1994 | ............ 62/228.3 |
| JP | 7-285320 | 10/1995 | |

* cited by examiner

Primary Examiner—William Wayner
(74) Attorney, Agent, or Firm—Morgan & Finnegan, LLP (57) ABSTRACT

An air-conditioning system with a refrigerant circulation circuit, which has improved control precision for maintaining a compartment temperature and improved response characteristics. The refrigerant circulation circuit includes a variable displacement type compressor, the discharge capacity of which is controlled by a control valve. The control valve detects a differential pressure between two pressure monitoring points in the refrigerant circulation circuit as an index for estimating the refrigerant discharge capacity of the variable displacement type compressor and performs feedback control of the discharge capacity of the compressor such that the differential pressure converges to a set differential pressure. A controller determines or recomputes the set differential pressure based on information from a mode switching unit or an air-flow-rate switch and instructs the control valve to change the set differential pressure accordingly. The switch information from the mode switching unit or the air-flow-rate switch signals the controller of a sudden change in the cooling load before the occurrence of the change or at the same time as the change occurs.

20 Claims, 8 Drawing Sheets

AIR CONDITIONING APPARATUS

BACKGROUND OF THE INVENTION

The present invention relates to an air-conditioning system having a refrigerant circulation circuit that includes a condenser, a depressurizing unit, an evaporator and a variable displacement type compressor.

In general, the refrigeration circuit of an air-conditioning system for a vehicle comprises a condenser, an expansion valve, or depressurizing unit, an evaporator and a compressor. The compressor draws and compresses a refrigerant gas, which flows in the refrigeration circuit from the evaporator and discharges the compressed gas toward the condenser. The evaporator transfers heat to the refrigerant that flows in the refrigeration circuit from the air inside the vehicle. As heat from the air that passes the peripheral portion of the evaporator is transmitted to the refrigerant that flows in the evaporator in accordance with the level of the thermal load or cooling load, the pressure of the refrigerant gas at the outlet or the downstream side of the evaporator reflects the level of the cooling load. A variable displacement type swash plate compressor, which is widely used as a vehicle compressor, has a displacement control mechanism that operates to keep the outlet pressure Ps' of the evaporator at a predetermined target value (called the set pressure). The displacement control mechanism performs feedback control on the discharge capacity of the compressor, or the inclination angle of the swash plate, with the outlet pressure Ps' of the evaporator (or a suction pressure Ps, which correlates with the outlet pressure Ps') as a control index such that the discharge amount of the refrigerant matches the level of the cooling load. A typical example of such a displacement control mechanism is a displacement control valve referred to as an internal control valve. The internal control valve detects the outlet pressure Ps' of the evaporator or the suction pressure Ps by means of a pressure sensitive member, such as a bellows or diaphragm. The valve body of the internal control valve is positioned by the displacement of the pressure sensitive member, thus adjusting the degree of opening of that valve. As a result, the pressure (crank pressure Pc) of the swash plate chamber (crank chamber) is adjusted to determine the inclination angle of the swash plate.

A simple internal control valve, which can only have a single set pressure, cannot provide delicate air-conditioning control. To provide such control, there is a variable set pressure type control valve, the set pressure of which can be changed externally. A the variable set pressure type control valve has, for example, the aforementioned internal control valve to which an actuator is connected. The force of the actuator can be adjusted electrically with, for example, an electromagnetic solenoid. The set pressure of the internal control valve can be changed by altering a mechanical force that acts on the pressure sensitive member by using the actuator.

The compressor is generally driven by the engine that drives the vehicle. The compressor is one of accessories that consume the engine power (or torque) and applies a large load to the engine. Under exceptional conditions such as during acceleration of the vehicle or during gradient climbing, i.e., when it is desirable to use the engine power only for driving, the air-conditioning system is operated such that the discharge capacity of the compressor is minimized and the engine load of the compressor is temporarily reduced. To minimize the discharge capacity of the compressor, the set pressure of the control valve should be set higher than the normal set pressure so that the current outlet pressure Ps', or the suction pressure Ps, becomes lower than the new set pressure. This works when minimizing the discharge capacity of the compressor so that the engine power can be used primarily for driving the vehicle.

However, a detailed analysis of the operation of a variable displacement type compressor that has the variable set pressure type control valve showed that the engine load could not necessarily be reduced by minimizing the discharge capacity of the compressor as intended as long as feedback control is performed with the outlet pressure Ps' or the suction pressure Ps used as an index.

Figure 8:
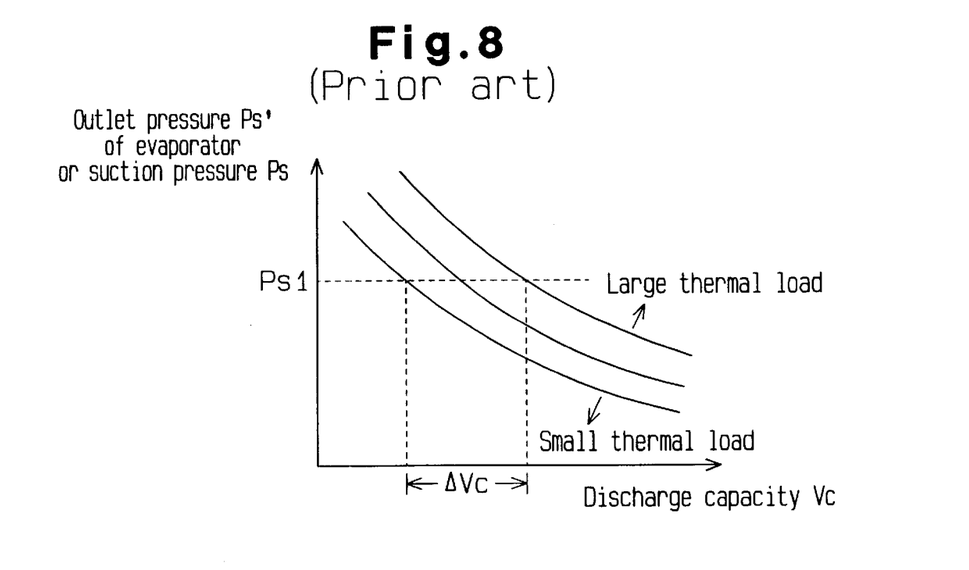
FIG. 8 is a graph showing the relationship between the pressure at the outlet of an evaporator and the discharge capacity according to prior art.

The graph of FIG. 8 shows generally the correlation between the outlet pressure Ps' or the suction pressure Ps and the discharge capacity Vc of the compressor. As apparent from this graph, there are a plurality of correlation curves (characteristic curves) of the outlet pressure Ps' or the suction pressure Ps and the discharge capacity Vc in accordance with the level of the thermal load (cooling load) in the evaporator. When the set pressure Pset, which is the target value of the feedback control, is a certain pressure Ps1, the discharge capacity of the compressor varies within a given range ($\Delta$Vc in FIG. 8) in accordance with the thermal load. When the thermal load of the evaporator is relatively large, for example, the actual discharge capacity Vc of the compressor cannot drop to reduce the engine load even if the set pressure Pset is set relatively high. That is, under a control procedure that depends on the outlet pressure Ps' or the suction pressure Ps, even if the set pressure Pset is changed to a high value, a change in the thermal load of the evaporator does not follow, so the discharge capacity cannot be decreased quickly.

A control procedure that controls the discharge capacity of a variable displacement type compressor based on the outlet pressure Ps' of the evaporator or the suction pressure Ps, which reflect the thermal load in the evaporator, can achieve the intended purpose of the air-conditioning system; that is, to make the room temperature stable regardless of a change in the temperature outside the vehicle to ensure the comfort of passengers inside the vehicle. When it is desirable to quickly reduce the discharge capacity of the compressor by temporarily neglecting the intended purpose of the air-conditioning system, for example under the exceptional circumstance where the power of the drive source (engine) is used primarily for driving, a control procedure that depends on the outlet pressure Ps' or the suction pressure Ps cannot sufficiently meet this need. The present invention was made in light of these circumstances.

SUMMARY OF THE INVENTION

Accordingly, it is an objective of the present invention to provide an air-conditioning system that can control the discharge capacity of a compressor to stabilize the room temperature, to quickly change the discharge capacity in exceptional circumstances, and to improve the precision of the control to stabilize the room temperature and the response characteristics.

In accordance with the present invention, there is provided an air-conditioning system comprising: a refrigerant circulation circuit including a condenser, a depressurizing unit, an evaporator and a variable displacement type compressor; two pressure monitoring points located in the refrigerant circulation circuit; a differential pressure detector for detecting a differential pressure between the pressures of a refrigerant at the two pressure monitoring points; an external information detector, which previously or simultaneously detects a variation in a cooling load and detects other external information; a means for determining a set differential pressure between the two pressure monitoring points based on the variation in the cooling load previously or simultaneously detected by the external information detector; and a displacement control unit for performing feedback control of the discharge capacity of the compressor such that the differential pressure detected by the differential pressure detector converges to the set differential pressure.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Before describing the first embodiment of this invention, the idea on which this invention is based will be discussed.

This invention is based on the following consideration. The following air-conditioning system satisfies quick alteration of the discharge capacity of a variable displacement type compressor under external control, when needed, without being influenced by the thermal load condition of the evaporator. In particular, the system controls the discharge capacity of the compressor to stabilize the room temperature and permits quick reduction of the discharge capacity of the compressor when necessary. This air-conditioning system performs feedback control of the discharge capacity of the variable displacement type compressor using a control valve that mechanically detects a differential pressure between two pressure monitoring points in a refrigerant circulation circuit and automatically adjusts the degree of opening of the valve based on the detected differential pressure and externally changes a set differential pressure. The set differential pressure is a target value of the feedback control. A control unit determines the set differential pressure through a recurring computation based on the result of comparison of temperature information from a temperature sensor, which is correlated with the temperature of the passenger compartment (hereinafter, the compartment), and a set temperature (desired temperature), which is set by a temperature setting unit. This determination is changed as needed.

The cooling load, or thermal load Q, in an air-conditioning system equipped with a refrigerant circulation circuit that comprises a condenser, a depressurizing unit (e.g., an expansion valve), an evaporator and a variable displacement type compressor is generally expressed by the following equation 1). In equation 1), G indicates the flow rate of air that passes through the evaporator (the flow of air per unit time), Iin indicates the enthalpy of the intake air before passing through the evaporator, Iout is the enthalpy of the air exiting the evaporator, and ΔI represents the difference between the two enthalpies.

$$Q = G \times (Iin - Iout) = G \times \Delta I \qquad 1)$$

Suppose that an intake regulator (e.g., a blower flow-rate switch) of the air-conditioning system is operated to rapidly increase the flow rate G of air that passes through the evaporator. The cooling load Q also increases in accordance with the equation 1), and the temperature and pressure (Ps') at the outlet of the evaporator increase accordingly. Then, the expansion valve is opened in response to an increase in the pressure at the outlet of the evaporator. The expansion valve opening increases the flow rate of the refrigerant in the refrigerant circulation circuit, thus increasing the differential pressure between the two pressure monitoring points (hereinafter referred to as the monitored differential pressure). At this time, the control valve, which responds to the differential pressure between the two pressure monitoring points, operates to counter the increase in the monitored differential pressure, reduces the discharge capacity of the compressor to decrease the flow rate of the refrigerant in the refrigerant circulation circuit. At this time, the temperature sensor should promptly detect a change in the temperature of the air leaving the evaporator, and the control unit should promptly perform recomputation and resetting of the set differential pressure corresponding to that temperature change without any delay from the action of the control valve. Actually, however, the resetting of the set differential pressure is likely to be delayed slightly due to the action of the control valve. This is because the transmission and detection of a change in pressure are accomplished instantly (based on the Pascal's principle), whereas the detection of a change in temperature by the temperature sensor is delayed by the delay of thermal transmission due to the thermal capacitance of the temperature sensor itself. In the transient period until the resetting of the set differential pressure between the two pressure monitoring points, therefore, the control valve that operates based on the differential pressure between the two pressure monitoring points may temporarily reduce the discharge capacity of the compressor, although the cooling load tends to increase. This operation is contrary to the intended purpose of air-conditioning. While this situation is overcome after the resetting of the set differential pressure is completed, the air-conditioning control nevertheless departs from the ideal, however transient or temporary it is. The cause for this undesirable situation is the unavoidable gap between the reaction time of the control valve in response to a pressure change and the time required for the control unit to acquire temperature information from the temperature sensor.

This invention is based on the idea that a change in the cooling load is detected before or at the same time that the change occurs, considering that the time delay is unavoidable as long as the control depends on temperature information from the temperature sensor. By this, determination of the set differential pressure and resetting of the set differential pressure in the control valve are carried out quickly, based on a change in the cooling load, at a speed that matches the reaction time of the control valve in response to a pressure change.

In the drawings, like numerals are used for like elements throughout.

A first embodiment of this invention, which is embodied in a vehicle air-conditioning system, will be described below.

Figure 1:
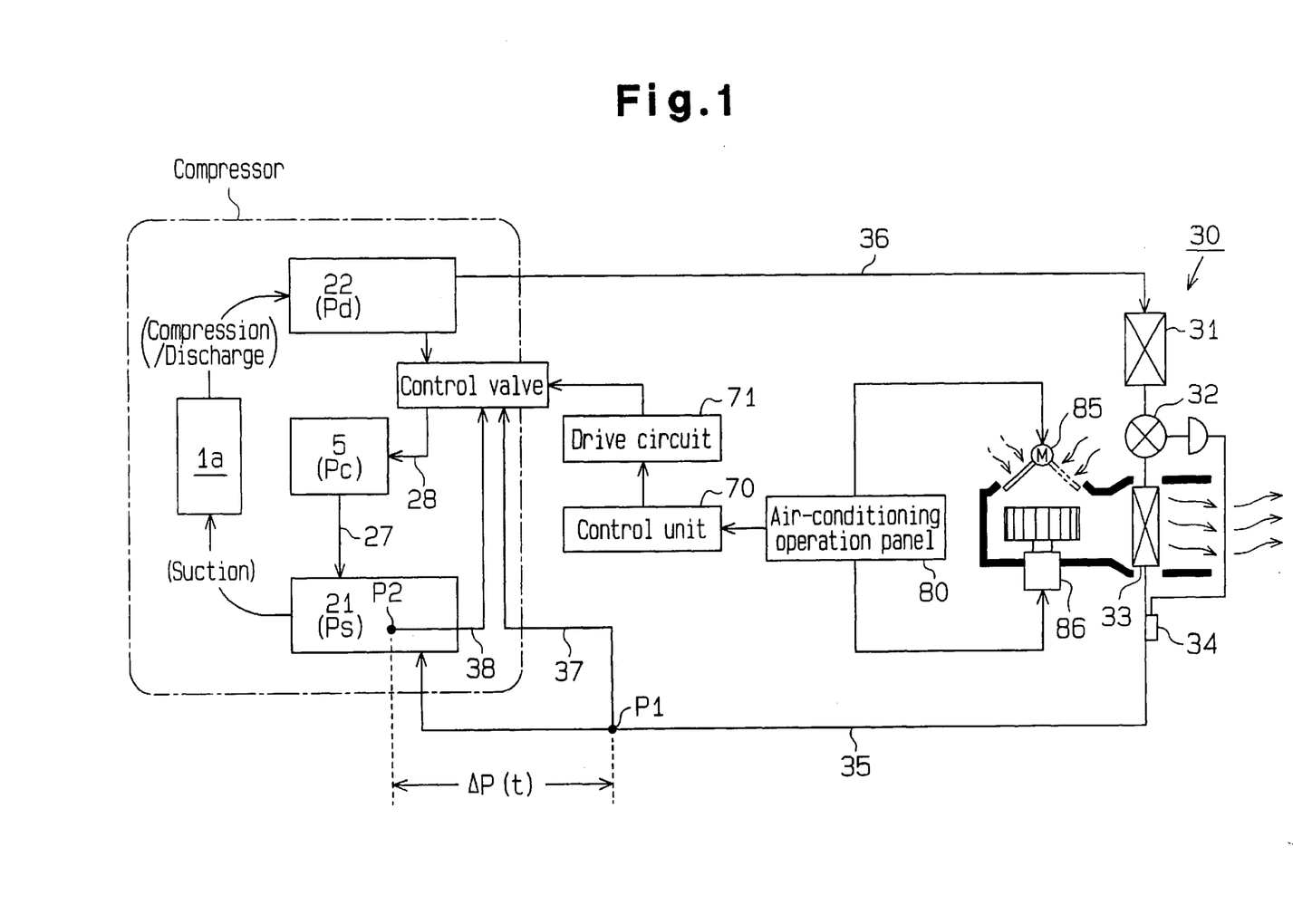
FIG. 1 is a diagram showing a refrigerant circulation circuit of an air-conditioning system.

As shown in FIG. 1, a refrigerant circulation circuit (refrigeration circuit) of a vehicle air-conditioning system includes a variable displacement type swash plate compressor CM and an external refrigeration circuit 30. The external refrigeration circuit 30 has, for example, a condenser 31, an expansion valve 32, or a depressurizing unit, an evaporator 33, a refrigerant gas pipe 35, which connects the outlet of the evaporator 33 to a suction chamber 21 of the compressor CM, and a refrigerant pipe 36, which connects a discharge chamber 22 of the compressor CM to the inlet of the condenser 31. The compressor CM draws and compresses refrigerant gas that is led into the suction chamber 21 from the evaporator 33 via the pipe 35 and discharges the compressed gas to the discharge chamber 22. The high-pressure gas in the discharge chamber 22 is supplied to the condenser 31 through the pipe 36. The expansion valve 32 performs automatic feedback control of the degree of its opening based on the pressure of the refrigerant and the temperature of the refrigerant, which is detected by a temperature sensor 34 provided near the outlet of the evaporator 33, so that an amount of refrigerant that matches the cooling load is supplied to the evaporator 33 from the condenser 31. The flow rate of the refrigerant in the external refrigeration circuit 30 is directly adjusted in this manner.

Description of the Compressor

Figure 2:
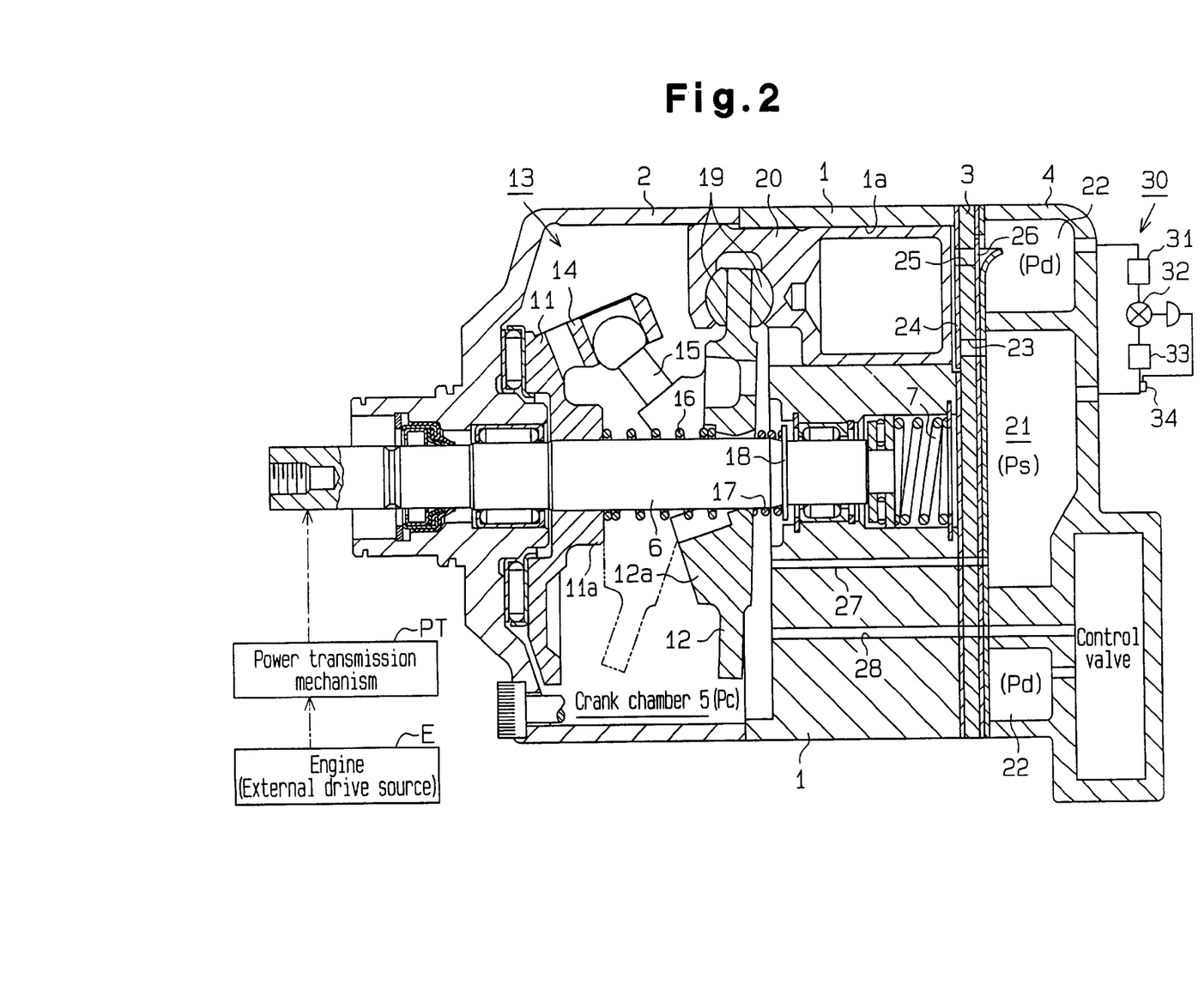
FIG. 2 is a cross-sectional view showing a variable displacement type swash plate compressor.

As shown in FIG. 2, a variable displacement type swash plate compressor includes a cylinder block 1, a front housing 2 connected to the front end of the cylinder block 1, and a rear housing 4 connected through a valve plate 3 to the rear end of the cylinder block 1. The cylinder block 1, front housing 2, valve plate 3 and rear housing 4 are securely connected together to form the housing of the compressor. A drive shaft 6 is supported in a crank chamber 5 defined in the housing. A lug plate 11 is fixed to the drive shaft 6 to rotate integrally with the drive shaft 6. The drive shaft 6 and lug plate 11 are urged forward by a spring 7. The front end of the drive shaft 6 is connected to an external drive source, which is a vehicle engine E in this embodiment, through a power transmission mechanism PT. In this embodiment, the power transmission mechanism PT is a normally transmitting type clutchless mechanism (e.g., a combination of a belt and a pulley)

A cam plate, which is a swash plate 12 in this embodiment, is accommodated in the crank chamber 5. The swash plate 12 is driven by the lug plate 11 and the drive shaft 6 through a hinge mechanism 13. The hinge mechanism 13 has two support arms 14 (only one shown) protruding from the rear face of the lug plate 11 and two guide pins 15 (only one shown) protruding from the front face of the swash plate 12. The linkage of the support arms 14 and the guide pins 15 and the contact of the swash plate 12 with the drive shaft 6, which is fitted in the center hole of the swash plate 12, cause the swash plate 12 to rotate synchronously with the lug plate 11 and the drive shaft 6 and to incline with respect to the drive shaft 6 as the swash plate 12 slides in the axial direction of the drive shaft 6. A spring 16 for reducing the inclination angle of the swash plate 12 is provided on the drive shaft 6 between the lug plate 11 and the swash plate 12. This spring 16 urges the swash plate 12 toward the cylinder block 1. A return spring 17 is provided on the drive shaft 6 between the swash plate 12 and a restriction ring 18 secured to the drive shaft 6. When the inclination angle of the swash plate 12 is at the maximum (indicted by a chain line), the return spring 17 does not apply any force to the swash plate 12. When the inclination angle of the swash plate 12 decreases (indicated by a solid line), on the other hand, the return spring 17 contracts as it is compressed between the swash plate 12 and the restriction ring 18 and urges the swash plate 12 away from the cylinder block 1.

A plurality of cylinder bores 1a (only one shown) are formed in the cylinder block 1 and a single-head piston 20 is retained in a reciprocative manner in each cylinder bore 1a. The front end of each piston 20 is connected to the peripheral portion of the swash plate 12 with a pair of shoes 19, so that each piston 20 and the swash plate 12 are coupled together by the shoes 19. When the swash plate 12 and the drive shaft 6 rotate together, therefore, the rotation of the swash plate 12 is converted to linear reciprocating motion of the pistons 20, the stroke of which correspond to the inclination angle $\theta$ of the swash plate 12. Between the valve plate 3 and the rear housing 4 are a suction chamber 21, at the center, and a discharge chamber 22, which surrounds the suction chamber 21. A suction port 23, a suction valve 24, for opening and closing the suction port 23, a discharge port 25 and a discharge valve 26, for opening and closing the discharge port 25, are formed in the valve plate 3 in association with each cylinder bore 1a. As each piston 20 reciprocates, refrigerant gas in the suction chamber 21 (the area of the suction pressure Ps) from the outlet of the evaporator 33 is drawn into the associated cylinder bore 1a via the suction port 23 and suction valve 24. As the piston 20 reciprocates, the refrigerant gas supplied into the cylinder bore 1a is compressed to a predetermined pressure and is discharged into the discharge chamber 22 (the area of the discharge pressure Pd) via the discharge port 25 and discharge valve 26.

In this compressor, when the drive shaft 6 is rotated by the power supplied from the engine E, the swash plate 12, which is inclined at a predetermined angle $\theta$, rotates accordingly. The inclination angle $\theta$ is the angle that is defined by the swash plate 12 and an imaginary plane perpendicular to the drive shaft 6. As the swash plate 12 rotates, the individual pistons 20 reciprocate by a stroke corresponding to the inclination angle $\theta$ of the swash plate 12, and the sequence of suction, compression and discharge of the refrigerant gas is repeated in each cylinder bore 1a as mentioned above.

The inclination angle $\theta$ of the swash plate 12 is determined based on the balance of various moments, such as a rotational moment caused by the centrifugal force of the rotation of the swash plate 12, a moment caused by the urging force of the spring 16 (and the return spring 17), a moment caused by the reciprocal force of inertia of the piston 20, and a moment caused by the gas pressure. The gas-pressure moment is generated based on the relationship between the pressure in the cylinder bores and the pressure of the crank chamber 5 (crank pressure Pc), which is the piston's back pressure, and acts both in the direction of reducing the inclination angle of the swash plate 12 and in the direction of increasing it depending on the crank pressure Pc. The compressor is designed to set the inclination angle $\theta$ of the swash plate 12 to any angle between the minimum inclination angle $\theta$min and a maximum inclination angle θmax by changing the gas-pressure moment by adjusting the crank pressure Pc with a displacement control valve CV (discussed later). The maximum inclination angle θmax of the swash plate 12 is restricted by a counter weight 12a of the swash plate 12, which abuts against a restriction portion 11a of the lug plate 11. The minimum inclination angle θmin of the swash plate 12 is determined by a balance of the force of the spring 16, the force of the return spring 17 and the gas-pressure moment when the gas pressure moment is maximized in the direction of reducing the inclination angle of the swash plate 12.

The crank pressure Pc is associated with the control of the inclination angle of the swash plate 12. The control mechanism that controls the crank pressure Pc includes a bleed passage 27, a supply passage 28 and the control valve CV, all of which are accommodated in the housing of the compressor. The bleed passage 27 connects the suction chamber 21 to the crank chamber 5. The supply passage 28 connects the discharge chamber 22 to the crank chamber 5, and the control valve CV is located in the supply passage 28. By adjusting the degree of opening of the control valve CV, the flow rate of high-pressure gas supplied to the crank chamber 5 through the supply passage 28 is adjusted and the crank pressure Pc is determined in consideration of the flow rate of the gas that is led out of the crank chamber 5 through the bleed passage 27. The difference between the crank pressure Pc and the pressure in the cylinder bores 1a is changed in accordance with a change in the crank pressure Pc. This changes the inclination angle θ of the swash plate 12, resulting in adjustment of the stroke of each piston 20 and the discharge capacity.

The Control Valve

Generally speaking, the greater the discharge capacity of the compressor is and the greater the flow rate of the refrigerant that flows in the refrigerant circulation circuit is, the larger the pressure loss per unit length of the circuit becomes. The pressures at two points P1 and P2 in the refrigerant circulation circuit are monitored, and the pressure loss (differential pressure) between the points correlates with the flow rate of the refrigerant. Therefore, detecting the differential pressure ΔP(t) between the two points P1 and P2 is an indirect detection of the discharge capacity of the compressor. In this embodiment, as shown in FIG. 1, the downstream pressure monitoring point P2 is located in the suction chamber 21 at a downstream end of the pipe 35, and the upstream pressure monitoring point P1 is located in the pipe 35 and spaced apart from the downstream point P2 by a predetermined distance. The gas pressure PsH at the upstream pressure monitoring point P1 is applied to the control valve CV through a first passage 37, and the gas pressure PsL at the downstream pressure monitoring point P2 (i.e., the suction pressure Ps) is applied to the control valve CV through a second passage 38. The control valve CV mechanically detects the differential pressure ΔP(t)= (PsH−PsL) and performs feedback control of the discharge capacity of the compressor by directly using the detected differential pressure in adjusting its opening degree.

Figure 3:
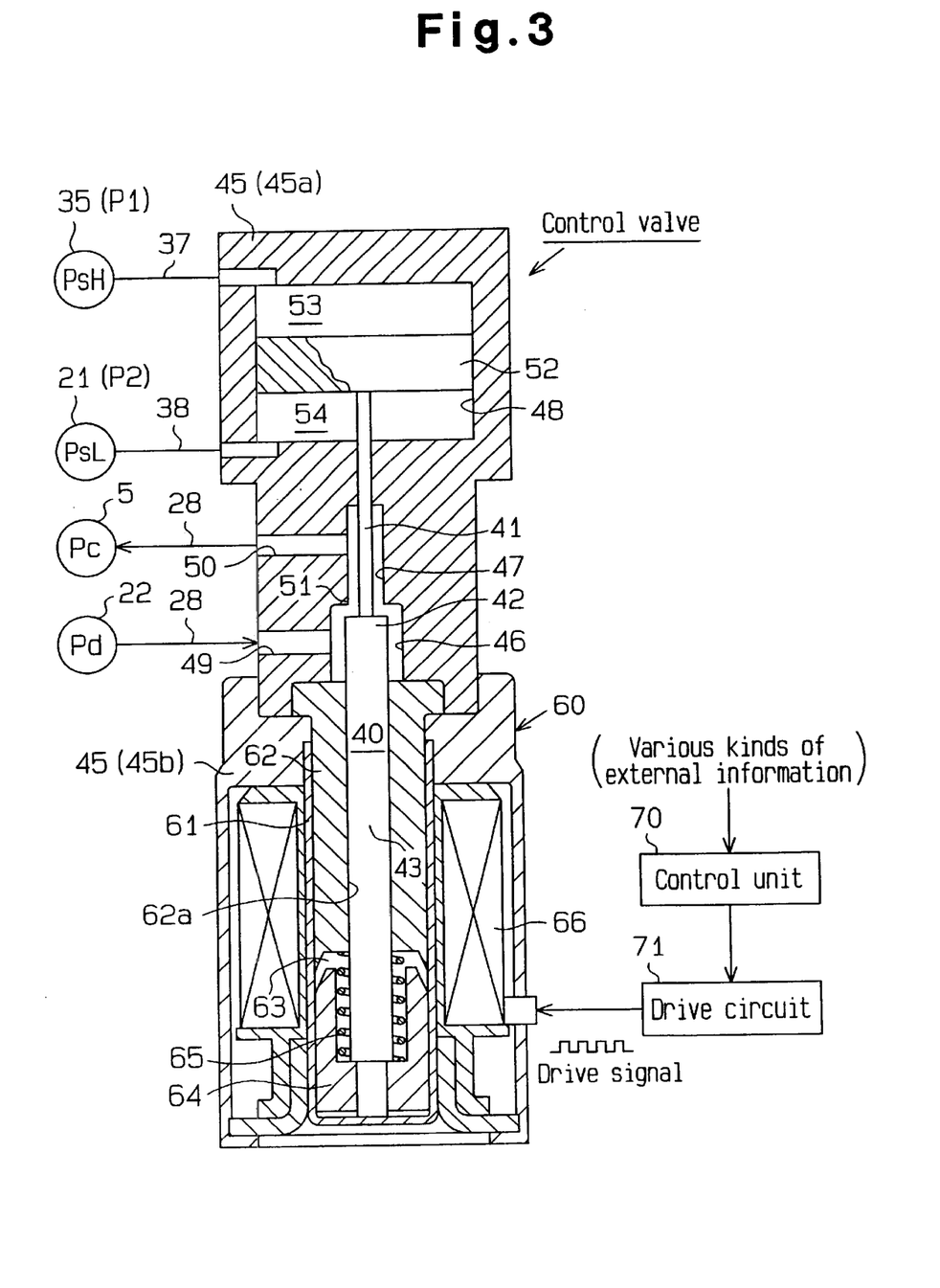
FIG. 3 is a diagrammatic cross-sectional view of a control valve.

As shown in FIG. 3, the control valve CV has an inlet-side valve portion, which occupies the upper half, and an electromagnetic actuator section 60, which occupies the lower half. The inlet-side valve portion adjusts the degree of opening (degree of restriction) of the supply passage 28, which connects the discharge chamber 22 to the crank chamber 5. The electromagnetic actuator section 60 displaces an actuation rod 40 in the control valve CV based on an externally supplied current and functions as an actuator for changing the set differential pressure. The actuation rod 40 is a rod that includes a small-diameter portion 41, which is at the distal end, a valve portion 42, which is nearly at the center, and a large-diameter portion 43, which is at the proximal end. A valve housing 45 of the control valve CV includes an upper body 45a, which forms the main part of the inlet-side valve portion, and a lower body 45b, which forms the main part of the electromagnetic actuator section 60.

A valve chamber 46, a communication passage 47 and a pressure sensitive chamber 48 are defined in the upper body 45a of the valve housing 45. The actuation rod 40 passes through the valve chamber 46, the communication passage 47 and the pressure sensitive chamber 48 and is movable in the axial direction (up and down directions in FIG. 3). While the valve chamber 46 and the communication passage 47 communicate with each other depending on the position of the actuation rod 40, the communication passage 47 and the pressure sensitive chamber 48 are completely isolated from each other in terms of pressure by a partition wall, which is a part of the valve housing 45. The bottom of the valve chamber 46 is formed by the upper surface of a fixed iron core 62, which is discussed later. A Pd port 49, which extends in the radial direction, is provided in a wall of the valve housing 45 that surrounds the valve chamber 46. The Pd port 49 connects the valve chamber 46 to the discharge chamber 22 through an upstream portion of the supply passage 28. A Pc port 50, which extends in the radial direction, is also formed in the outer wall of the valve housing 45 that surrounds the communication passage 47. This Pc port 50 connects the communication passage 47 to the crank chamber 5 through a downstream portion of the supply passage 28. Therefore, the Pd port 49, the valve chamber 46, the communication passage 47 and the Pc port 50 form a part of the supply passage 28 that connects the discharge chamber 22 to the crank chamber 5 in the inlet-side valve portion of the control valve CV.

The valve portion 42 of the actuation rod 40 is in the valve chamber 46. The inside diameter of the communication passage 47 is larger than the diameter of the small-diameter portion 41 and smaller than the diameter of the large-diameter portion 43. Therefore, the step that is located at the boundary between the valve chamber 46 and the communication passage 47 serves as a valve seat 51, and the communication passage 47 serves as a valve hole. When the actuation rod 40 moves upward to its uppermost position where the valve portion 42 contacts the valve seat 51 (FIG. 3 shows the lowermost position), the communication passage 47 is blocked. That is, the valve portion 42 of the actuation rod 40 adjusts the degree of opening of the supply passage 28.

The distal end of the small-diameter portion 41 of the actuation rod 40 is located in the pressure sensitive chamber 48 and is fixed to a movable wall 52. The movable wall 52 separates the pressure sensitive chamber 48 into two chambers: a P1 pressure chamber 53 and a P2 pressure chamber 54. Although the movable wall 52 is movable in the axial direction in the pressure sensitive chamber 48, it does not permit direct connection of the P1 pressure chamber 53 to the P2 pressure chamber 54. The P1 pressure chamber 53 normally communicates with the point P1 in the pipe 35 through a port formed in the valve housing 45 and the first passage 37. The P2 pressure chamber 54 normally communicates with the suction chamber 21 (the point P2) through a port formed in the valve housing 45 and the second passage 38. That is, the pressure at the pressure monitoring point P1 (pressure PsH) is applied to the P1 pressure chamber 53, and the pressure Ps in the suction chamber 21

(pressure PsL) is applied to the P2 pressure chamber 54. The top and bottom surfaces of the movable wall 52 are pressure-receiving faces that are respectively exposed to the pressures PsH and PsL. Since the pressure-receiving faces have substantially the same pressure-receiving area S, the movable wall 52 applies a downward force F1=(PsH−PsL)×S based on the differential pressure. The pressure sensitive chamber 48, the movable wall 52, the P1 pressure chamber 53 and the P2 pressure chamber 54 constitute mechanical differential pressure detecting means incorporated in the control valve.

The electromagnetic actuator section 60 of the control valve has a cylindrical retainer cylinder 61 with a bottom. The fixed iron core 62 is fitted in the upper portion of the retainer cylinder 61, thus defining a solenoid chamber 63 in the retainer cylinder 61. A movable iron core 64, or plunger, is retained in the solenoid chamber 63 to move in the axial direction. An axial hole is formed in the center of the fixed iron core 62. The large-diameter portion 43 of the actuation rod 40 is placed in the hole of the fixed iron core 62 and movable in the axial direction. The lower end of the large-diameter portion 43 is fitted into a hole bored through in the center of the movable iron core 64 in the solenoid chamber 63 and is fixed by crimping. Therefore, the movable iron core 64 and the actuation rod 40 move axially together. There is a slight clearance 62a between the wall of the center hole of the fixed iron core 62 and the large-diameter portion 43 of the actuation rod 40, and the valve chamber 46 is connected to the solenoid chamber 63 through the clearance 62a. Therefore, the discharge pressure Pd is applied the solenoid chamber 63.

A return spring 65 is located in the solenoid chamber 63 between the fixed iron core 62 and the movable iron core 64. The return spring 65 urges the movable iron core 64 and the actuation rod 40 downward. The return spring 65 therefore initializes, or returns the movable iron core 64 and the actuation rod 40 to their lowest position (the initial position at the time of deenergization). A coil 66 is wound around the fixed iron core 62 and the movable iron core 64, surrounding both cores 62 and 64. The control of energization of the coil 66 may be either analog current-value control or duty control, which changes a duty ratio Dt at the time of energization. This embodiment employs the duty control method. In response to an instruction from a control unit 70, a drive circuit 71 supplies a drive signal of a predetermined duty ratio Dt to the coil 66. The coil 66 generates an electromagnetic force F2, the magnitude of which corresponds to the duty ratio Dt. The electromagnetic force F2 causes the movable iron core 64 to be attracted toward the fixed iron core 62, moving the actuation rod 40 upward. The control valve CV is designed to increase the degree of valve opening as the duty ratio Dt decreases and decrease the degree of valve opening as the duty ratio Dt increases.

The position of the actuation rod 40 in the control valve CV (or the degree of valve opening) is roughly determined as follows. When no current is supplied to the coil 66 (Dt=0%), the return spring 65 dominates, and the actuation rod 40 is located at the lowermost position, which is shown in FIG. 3. At this time, the valve portion 42 of the actuation rod 40 is most separated from the valve seat 51 so that the inlet-side valve portion is fully opened. When the coil 66 is energized with the minimum duty in the duty ratio range, the upward electromagnetic force F2 exceeds a downward force f2 of the return spring 65. Then, an upward force (F2−f2) produced by the electromagnetic actuator section 60 acts against a downward force F1 based on the differential pressure. When the coil 66 is energized, therefore, the valve portion 42 of the actuation rod 40 is positioned with respect to the valve seat 51 such that the upward force (F2−f2) and the downward force F1 are balanced, and the degree of opening of the control valve CV is thus determined. In accordance with the degree of valve opening, the flow rate of gas to the crank chamber 5 through the supply passage 28 is determined, and the crank pressure Pc is adjusted in consideration of the flow rate of gas discharged from the crank chamber 5 through the bleed passage 27. That is, adjusting the degree of opening of the control valve CV adjusts the crank pressure Pc.

The degree of opening of the control valve CV is based on the balance of the downward force F1, which is based on the differential pressure, and the upward force (F2−f2), which is created by the spring 65 and the electromagnetic actuator section 60, and only the upward electromagnetic force F2 is adjustable. Adjusting the electromagnetic force F2 therefore adjusts the force F1. Since the force F1 reflects the differential pressure ΔP(t) between PsH and PsL as mentioned above, the differential pressure ΔP(t) can be set to a desired target differential pressure, or a set differential pressure TPD, by adjusting the electromagnetic force F2 through electrical control of the coil 66. That is, the set differential pressure TPD is determined by the amount of the current supplied to the coil 66. In this sense, the electromagnetic actuator section 60 of the control valve CV, the drive circuit 71, and the control unit 70 form a set differential pressure changing apparatus for externally changing the target or reference differential pressure value (set differential pressure) of the automatic adjustment of the degree of opening of the control valve CV. The control valve CV merely serves as a flow regulating valve for maintaining the set differential pressure TPD according to the electromagnetic force F2, unless the electromagnetic force F2 changes. Since the set differential pressure TPD can be changed by changing the electromagnetic force F2 with an external controller, however, the control valve CV also serves as a displacement control valve that controls the discharge capacity of the compressor.

Electronic Control System

Figure 4:
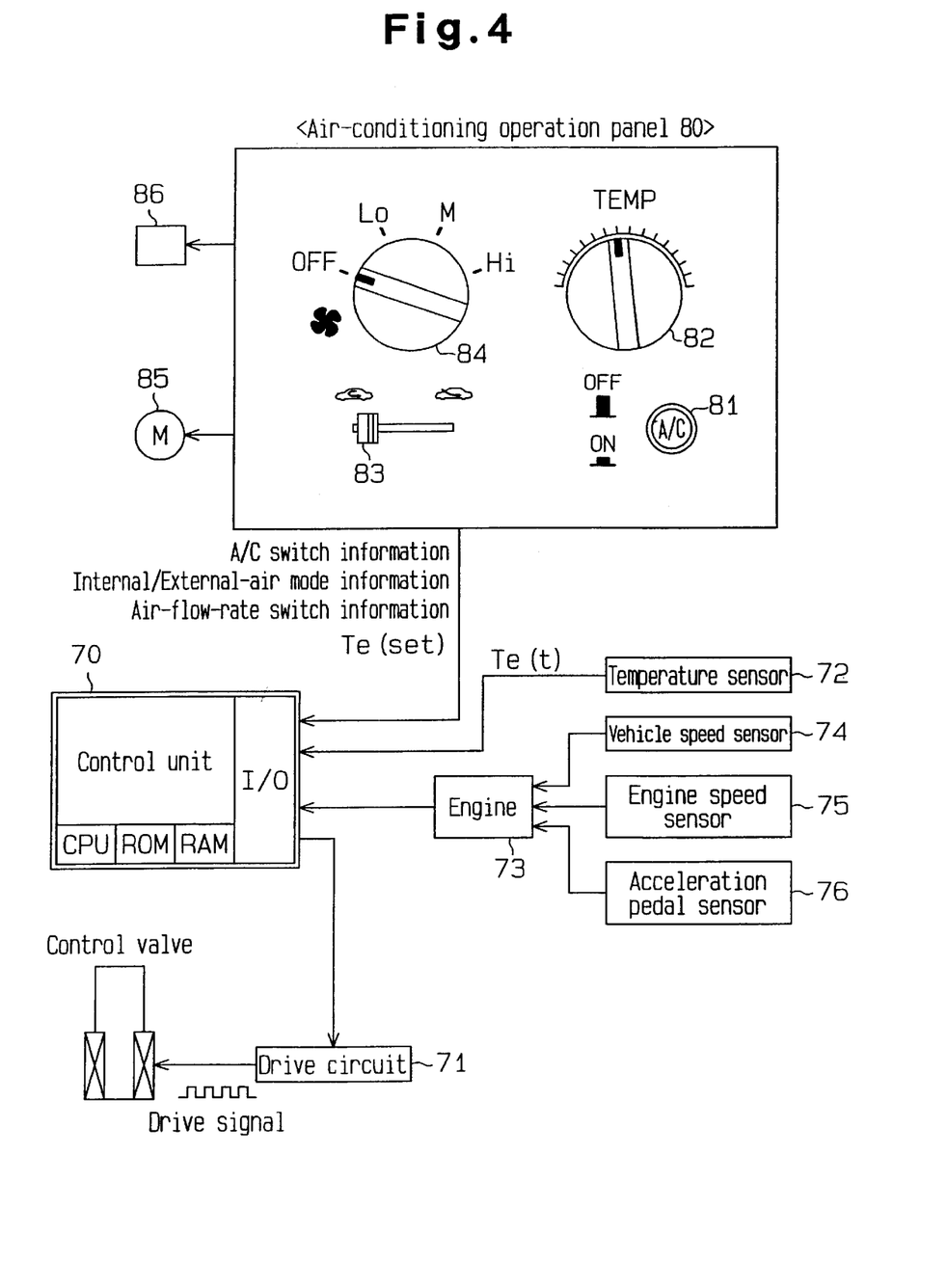
FIG. 4 is a block diagram illustrating the outline of an electronic control system.

As shown in FIG. 4, the vehicle air-conditioning system includes the control unit 70, which performs general control of the air-conditioning system. The control unit 70 is a computer-like control unit and has at least a CPU, ROM, RAM and input/output (I/O) interface circuit. Various kinds of control programs (see flowcharts in FIGS. 5 and 6), which are discussed later, and initial data are stored in the ROM. The RAM provides a working memory area. The I/O interface circuit of the control unit 70 has a plurality of input and output terminals. The output terminals of the I/O interface circuit are connected to the drive circuit 71. The drive circuit 71 sends a duty-controlled drive signal to the coil 66 of the control valve in response to an instruction from the control unit 70.

As shown in FIG. 4, at least an air-conditioning operation panel 80, a temperature sensor 72 and an engine ECU (Electronic Control Unit) 73 for the engine are connected to the input terminals of the I/O interface circuit of the control unit 70.

The air-conditioning operation panel 80 has an A/C switch 81, a temperature setting unit 82, an inside/outside air select lever 83 and an air-flow-rate switch 84. The air select lever 83 and an air-flow-rate switch 84 serve to signal a change in the cooling load. The A/C switch 81 is an ON/OFF switch for the air-conditioning system and is operated by a passenger in the vehicle. A/C switch 81 provides the control unit 70 with the ON/OFF status of the air-conditioning system. The temperature setting unit 82 is operated by a passenger in the vehicle to set the desired temperature and sends information regarding the set temperature Te(set) to the control unit 70.

The inside/outside air select lever 83 is a mode select switch for selecting an internal-air circulation mode or an outside-air inlet mode for the air that passes near the evaporator 33 and flows into the compartment. In accordance with the manipulation of the inside/outside air select lever 83, the operation of a servo motor 85 (see FIG. 1) for driving an inside/outside air switching door is controlled and the control unit 70 is provided with information about selection of the internal-air circulation mode or the outside-air inlet mode. The air-flow-rate switch 84 serves to select one of four flow rate states, "OFF", "Lo", "M" and "Hi" for the air that passes near the evaporator 33 and flows into the compartment. The four flow rate states correspond to the rotational speeds of a blower motor 86 (see FIG. 1). The blower motor 86 is stopped in the "OFF" state, and the speed of the blower motor 86 increases as the state changes from "Lo" to "M" to "Hi". The "Lo", "M" and "Hi" states respectively correspond to a low flow rate, an intermediate flow rate, and a strong flow rate of air. In accordance with the operation of the air-flow-rate switch 84, the operation of the blower motor 86 is controlled and the control unit 70 is supplied with information about the air flow rate.

The temperature sensor 72, which is provided in the vicinity of the exit side of the evaporator 33, detects a temperature Te(L) of exiting air, which has been cooled by the evaporator 33, and provides the control unit 70 with information on the exit air temperature of the evaporator 33, or the compartment temperature. Although the temperature of the exiting air does not normally coincide with the room temperature, these two temperatures have a high correlation. Since the temperature of the exiting air is a physical quantity that is closely correlated with the enthalpy Iout of the blowout air, detecting the temperature of the exiting air by the temperature sensor 72 indirectly detects the enthalpy difference ΔI.

The engine ECU 73 is an electronic control unit for an engine E mounted in the vehicle and is connected to at least a vehicle speed sensor 74, an engine speed sensor 75 and an acceleration pedal sensor 76. The acceleration pedal sensor 76 detects the position, or the degree of opening, of a throttle valve located in the intake manifold of the engine. The position of the throttle valve reflects the depression amount of the acceleration pedal. That is, the control unit 70 is provided with information about the running conditions of the vehicle, i.e., data representing the vehicle speed V, the engine speed NE and the depression amount of the acceleration pedal or the acceleration angle Ac(t), from the engine ECU 73. The various sensors 72, 74, 75 and 76 and the various switches 81, 82, 83 and 84 on the air-conditioning operation panel 80 form an external information detecting device that provides the control unit 70 with various kinds of external information.

Based on the various kinds of external information provided from the external information detecting device, the control unit 70 determines the current conditions, computes the proper duty ratio Dt of the drive signal to be sent to the coil 66 of the control valve and instructs the drive circuit 71 to output a drive signal with the computed duty ratio Dt. As a result, the set differential pressure TPD of the control valve CV is optimized and the control valve CV automatically adjusts its opening degree to steer the differential pressure ΔP(t) to the set differential pressure TPD. Accordingly, the crank pressure Pc is changed promptly and the piston stroke (which represents the discharge capacity and reflects the load torque) is changed quickly. That is, the control unit 70 serves to set the differential pressure and, together with the drive circuit 71 and the control valve CV, regulates the discharge capacity.

The duty control of the control valve by the control unit 70 will now be discussed referring to the flowcharts in FIGS. 5 and 6.

Figure 5:
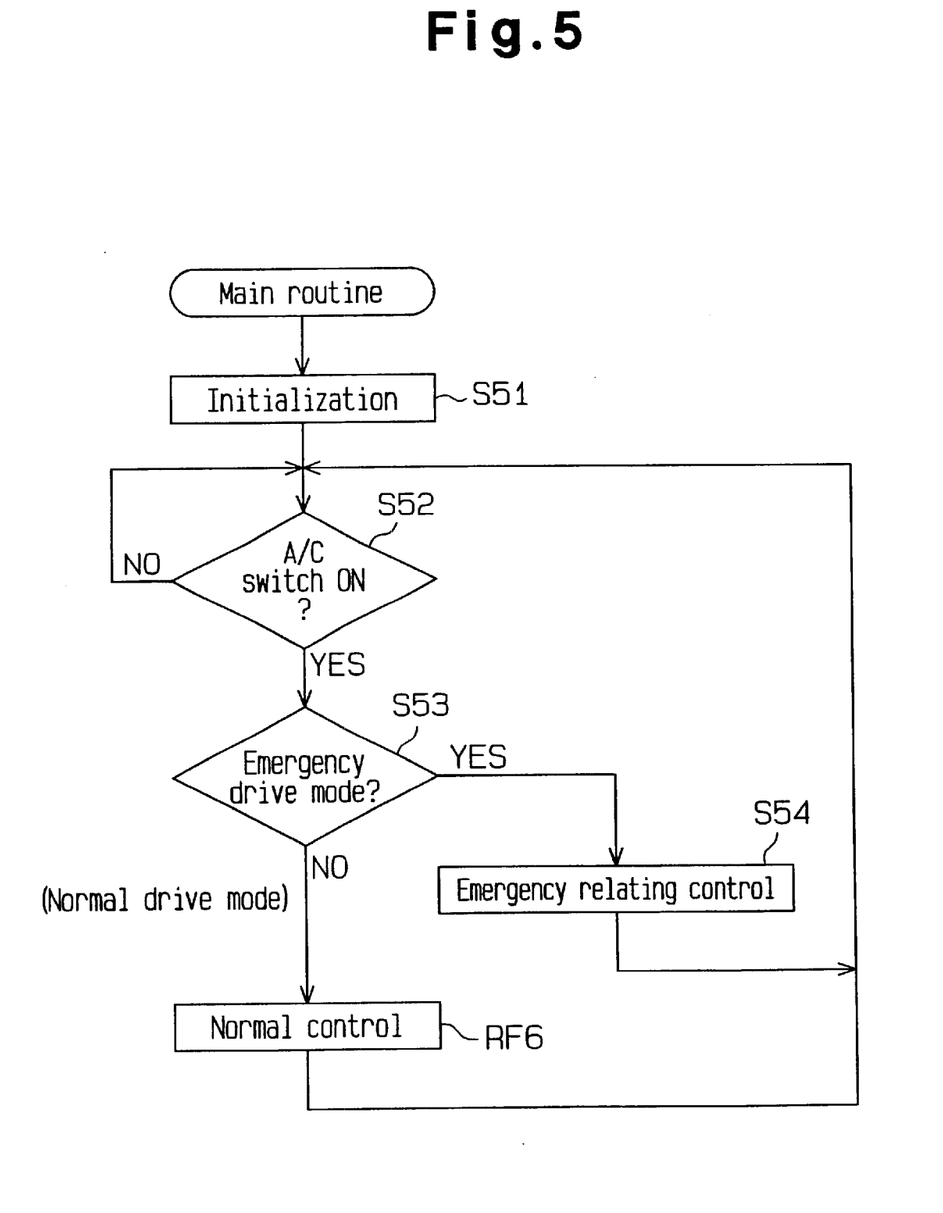
FIG. 5 is a flowchart of a main routine of discharge capacity control.

The flowchart in FIG. 5 shows the main routine of an air-conditioning control program. When the vehicle ignition switch (or start switch) is set ON, the control unit 70 is supplied with power and starts an arithmetic operation. In step S51 (hereinafter simply referred to as "S51", and the same shall apply to other steps) in FIG. 5, the control unit 70 performs various initialization steps in accordance with an initialization program. For example, an initial value or a temporary value is given to the duty ratio Dt of the drive signal. Then, the flow proceeds to a process of monitoring the status and a process for computation of the duty ratio, which are illustrated in a sequence of steps starting at S52.

In S52, the ON/OFF state of the A/C switch 81 is monitored until the A/C switch 81 is set ON. When the A/C switch 81 is set ON, the process goes to an exceptional circumstances decision routine (S53). In S53, the control unit 70 determines if the vehicle is in an exceptional state or an exceptional drive mode based on external information. The exceptional drive mode occurs when the engine E is in a high-load state such as when climbing a hill or when overtaking another vehicle (at least when the driver wants rapid acceleration). In either case mentioned, the high-load state or the acceleration state can be estimated by comparing the acceleration position indicated by the acceleration pedal sensor 76 with a predetermined value.

When the decision result in S53 is YES or when the vehicle is in the exceptional drive mode, the control unit 70 performs an exceptional control procedure (S54). The exceptional control procedure, for example, changes the duty ratio Dt of the drive signal to zero or to a minimum value Dt(min) in its variation range for a predetermined period Δt from the point of time when the high-load state of the engine or the acceleration state was detected for the first time. In the period Δt, in which the duty ratio Dt is minimized, the control valve CV is open to the maximum degree regardless of the differential pressure ΔP(t) between the two points, and the crank pressure Pc is increased instantly to quickly minimize the inclination angle θ, thus minimizing the discharge capacity of the compressor. As a result, the load of the engine E is reduced so that all or most of the engine power can be used for driving the vehicle. Although the cooling performance of the air-conditioning system is sacrificed in the period Δt, which is a short period, the temporary sacrifice of the cooling performance does not significantly disrupt the comfort of the passengers.

When none of the conditions are met in the exceptional drive mode decision routine, the decision in S53 is NO. In this case, it is considered that the vehicle is in a steady state, or a normal drive mode. The normal drive mode refers to a state in which none of the monitoring conditions in the exceptional drive mode decision routine is satisfied, and indicates a state in which it is possible to estimate that the vehicle is in a steady running condition. When the decision result in S53 is NO, the process goes to a normal control routine RF6. In many cases, the processing in the main routine in FIG. 5 returns to step S52 after going through the processes in the normal control routine RF6.

Figure 6:
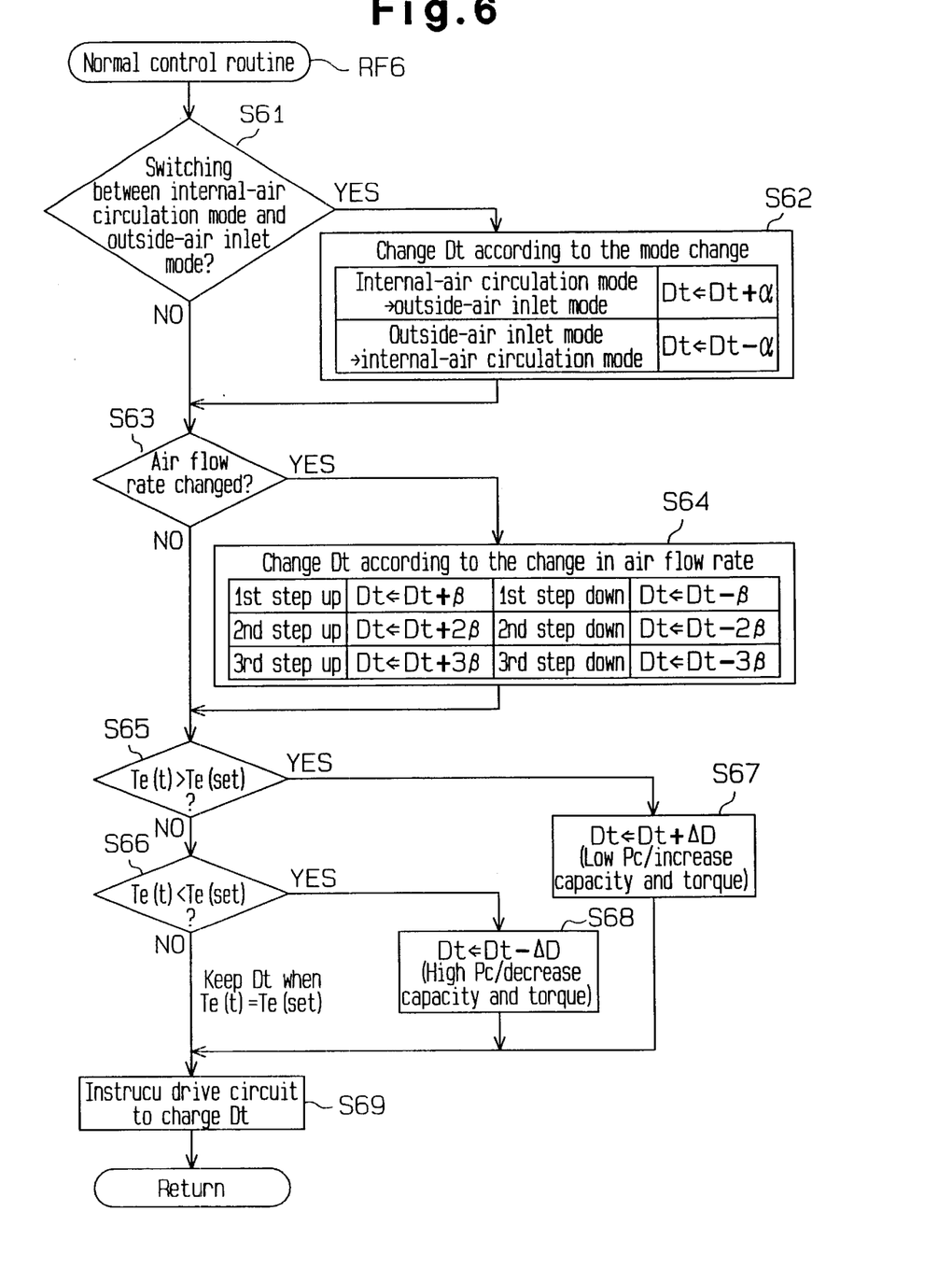
FIG. 6 is a flowchart of a normal control routine.

The normal control routine RF6 in FIG. 6 illustrates a sequence of procedures that relate to the air-conditioning performance in the normal operation mode, or feedback control of the discharge capacity of the compressor. Since the control valve CV, which has the movable wall 52 for detecting the differential pressure ΔP(t), adjusts its opening size internally, mechanically and automatically in accordance with changes in the differential pressure, the main processing in the routine RF6 is to correct the set differential pressure TPD of the control valve in accordance with the state of the thermal load in the evaporator 33, i.e., recurring correction of the duty ratio Dt.

First, the control unit 70 determines in S61 whether the air intake mode has been switched between the internal-air circulation mode or the outside-air inlet mode by the inside/outside air select lever 83, i.e., whether the mode in the current cycle differs from the mode in the previous cycle.

In general, merely switching the air intake mode of the air that passes near the evaporator between the internal-air circulation mode and the outside-air inlet mode significantly changes the cooling load Q in the equation 1. This is because the air flow rate G of the air differs between the internal-air circulation mode or the outside-air inlet mode and the enthalpy Iin of the intake air differs between the case where the inside air is recirculated and the case where outside air is drawn in.

When the decision result in S61 is YES, therefore, the control unit 70 corrects the duty ratio Dt in S62. That is, when the air intake mode has changed to the outside-air inlet mode, the duty ratio Dt is increased by a predetermined amount α. When the air intake mode has changed to the internal-air circulation mode, on the other hand, the duty ratio Dt is decreased by the predetermined amount α. The reason for this correction is that, since hot air is more likely to enter the compartment in the outside-air inlet mode than in the internal-air circulation mode, the cooling load Q is larger in the outside-air inlet mode. In the outside-air inlet mode, therefore, the duty ratio Dt is intentionally increased to reduce the crank pressure Pc, thereby increasing the discharge capacity of the compressor. In the internal-air circulation mode, on the other hand, the duty ratio Dt is intentionally decreased to increase the crank pressure Pc, thereby decreasing the discharge capacity of the compressor. The predetermined amount α is set to, for example, ten to 100 times the unit amount ΔD mentioned in S67 and S68, which will be discussed later.

Next, the control unit 70 determines in S63 whether the air flow rate has been changed by the air-flow-rate switch 84, i.e., whether the air flow rate in the present decision differs from the air flow rate in the previous decision. In general, merely changing the flow rate of air G that passes through the evaporator significantly changes the cooling load Q in equation 1). When the decision result in S63 is YES, therefore, the control unit 70 corrects the duty ratio Dt according to the switching of the air flow rate in S64. In S64, the process depends on whether the present air flow rate has increased (up) from the previous air flow rate or decreased (down) from the previous air flow rate, and a correction of the duty ratio Dt depends on the level of the change made by the air-flow-rate switch 84. As apparent from the list in S64, when the air flow rate is increased by one step (e.g., from "OFF" to "Lo"), the duty ratio Dt is increased by a predetermined amount β, when the air flow rate is increased by two steps (from "OFF" to "M"), the duty ratio Dt is increased by a predetermined amount 2β, and when the air flow rate is increased by three steps (from "OFF" to "Hi"), the duty ratio Dt is increased by a predetermined amount 3β. When the air flow rate is decreased by one step (e.g., from "Lo" to "OFF"), the duty ratio Dt is decreased by the predetermined amount β, when the air flow rate is decreased by two steps (from "M" to "OFF"), the duty ratio Dt is decreased by the predetermined amount 2β, and when the air flow rate is decreased by three steps (from "Hi" to "OFF"), the duty ratio Dt is decreased by the predetermined amount 3β. The reason for this is that the amount of change in the cooling load Q changes in accordance with a change in the flow rate G of the air passing through the evaporator 33. As the air flow rate G increases, therefore, the duty ratio Dt is intentionally increased to reduce the crank pressure Pc, which increases the discharge capacity of the compressor. As the air flow rate G decreases, on the other hand, the duty ratio Dt is intentionally decreased to increase the crank pressure Pc, which decreases the discharge capacity of the compressor.

Figure 7:
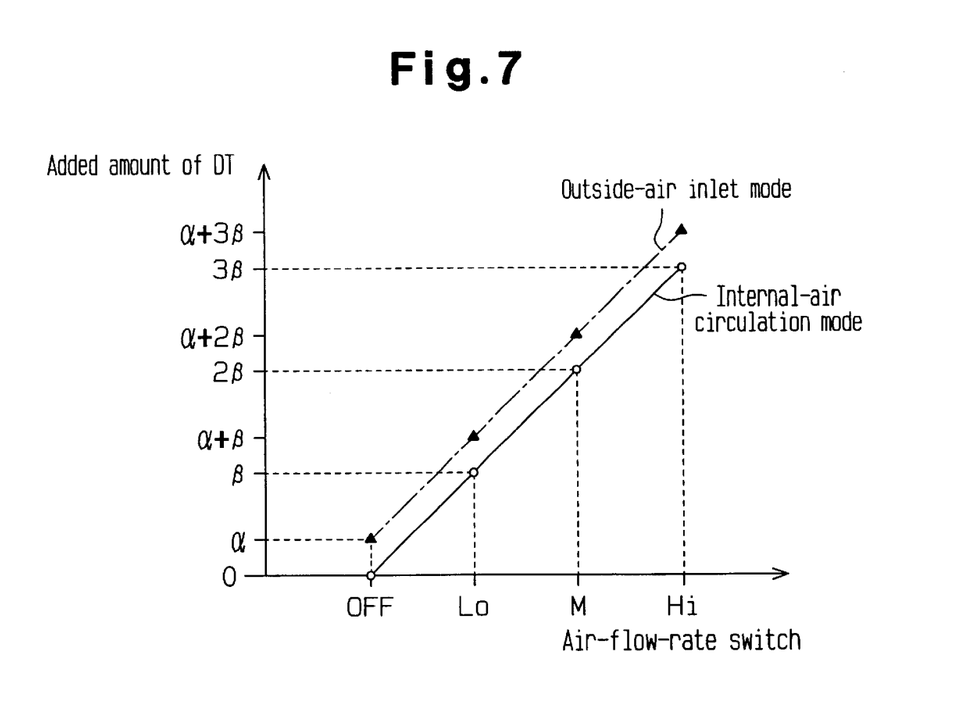
FIG. 7 is a graph showing the relationship between the setting of an air-flow-rate switch and the added amount of Dt.

A graph in FIG. 7 shows how the duty ratio Dt changes in accordance with the internal-air circulation mode or the outside-air inlet mode and the state of the air-flow-rate switch 84 through the sequence of processes of S61–S64. If the inside/outside air select lever 83 is held at the internal-air circulation mode and the air-flow-rate switch 84 is kept OFF, the decision result in S61 and the decision result in S63 both become NO, no matter how many times the routine RF6 is repeated, and no amount is added to the duty ratio Dt so that duty ratio Dt at the beginning of the routine RF6 is maintained, and the flow proceeds to a sequence of steps starting at S65. Immediately after the inside/outside air select lever 83 is switched to the outside-air inlet mode from the internal-air circulation mode in this state, for example, the decision result in S61 is YES and α is added to the duty ratio Dt at the beginning of the routine RF6 in S62. Immediately after the air-flow-rate switch 84 is switched to "M" from "OFF", the decision result in S63 is YES and 2β is added to the duty ratio Dt at the beginning of the routine RF6 in S64. Because the addition of α or the addition of 2β is carried out only immediately after the switching of the lever 83 or the switch 84, the duty ratio Dt when the outside-air inlet mode and the air flow rate "M" have been selected and maintained is greater by (α+2β) than the duty ratio Dt when the internal-air circulation mode and the air flow rate "OFF" have been selected and maintained (i.e., the set differential pressure TPD is intentionally increased by that amount). When the lever 83 is set back to the internal-air circulation mode and the air flow rate is set back to "OFF" thereafter, the duty ratio Dt is decreased by α in S62 or by 2β in S64, and the duty ratio Dt returns to the initial state (nothing added) of the internal-air circulation mode and the air flow rate "OFF". That is, switching the internal-air circulation mode or changing the air flow rate changes the cooling load in the evaporator 33. The process of changing the duty ratio Dt in S61–S64 is to correct the set differential pressure TPD of the control valve when the switching takes place to handle the change instantly, thus ensuring adequate air-conditioning.

After the process of S63 or S64, the control unit 70 determines in S65 whether the temperature Tc(t) detected by the temperature sensor 72 is higher than the temperature Te(set) set by the temperature setting unit 82. When the decision result in S65 is NO, the control unit 70 determines in S66 whether the detected temperature Tc(t) is lower than the set temperature Te(set). When the decision result in S66 is also NO, the detected temperature Tc(t) coincides with the set temperature Te(set) and it is unnecessary to change the set differential pressure TPD or the duty ratio Dt, which change the cooling performance.

When the decision result in S65 is YES, it is predicted that it is hot inside the vehicle and the cooling load is heavy. Therefore, the control unit 70 increases the duty ratio Dt by the unit amount ΔD in S67. When the duty ratio of the drive signal is increased to Dt+ΔD, the electromagnetic force F2 of the electromagnetic actuator section 60 increases slightly, thus slightly increasing the set differential pressure TPD of the control valve CV. Then, the upward and downward forces are imbalanced under the differential pressure ΔP(t) at that time, so that the actuation rod 40 moves upward against the force of the return spring 65. The consequential increase in the downward urging force f2 of the return spring 65 compensates for the increase in the upward electromagnetic urging force F2, thereby positioning the valve portion 42 of the actuation rod 40 again to the position where F1=(F2−f2) is satisfied. As a result, the degree of opening of the control valve (i.e., the degree of opening of the supply passage 28) decreases slightly, thus lowering the crank pressure Pc. This reduces the difference between the crank pressure Pc and the pressure of the cylinder bores, thus increasing the inclination angle of the swash plate 12. This increases the discharge capacity of the compressor and the load torque. As the discharge capacity of the compressor increases, the heat absorption in the evaporator 33 is increased so that the temperature Tc(t) tends to drop. Further, the differential pressure ΔP(t) between the pressure monitoring points P1 and p2 increases. The increase in the differential pressure ΔP(t) causes the mechanical feedback to increase the degree of opening of the control valve.

When the decision result in S66 is YES, it is assumed that it is cold inside the vehicle and the cooling load is light. Therefore, the control unit 70 decreases the duty ratio Dt by the unit amount ΔD in S68. When the duty ratio of the drive signal is changed to the decreased value of (Dt−ΔD), the electromagnetic force F2 of the electromagnetic actuator section 60 is weakened slightly, which slightly lowers the set differential pressure TPD of the control valve CV. Thus, the upward and downward urging forces are imbalanced under the differential pressure ΔP(t) at that time, so that the actuation rod 40 moves downward to decrease the force of the return spring 65. The decrease in the downward force f2 of the return spring 65 compensates for the decrease in the upward electromagnetic force F2, thereby positioning the valve portion 42 of the actuation rod 40 again to the position where F1=(F2−f2) is satisfied. Consequently, the degree of opening of the control valve (i.e., the degree of opening of the supply passage 28) increases slightly, thus increasing the crank pressure Pc. This increases the difference between the crank pressure Pc and the pressure of the cylinder bores, thus reducing the inclination angle of the swash plate 12. This decreases the discharge capacity of the compressor and the load torque. As the discharge capacity of the compressor drops, the heat absorption in the evaporator 33 decreases and the temperature Tc(t) tends to increase. Further, the differential pressure ΔP(t) between the pressure monitoring points P1 and p2 decreases. The decrease in the differential pressure ΔP(t) causes the mechanical feedback to reduce the opening degree of the control valve.

When the detected temperature Te(t) differs from the set temperature Te(set), the set differential pressure TPD of the control valve is gradually optimized through the correction of the duty ratio Dt done in the S67 and/or the S68, and the mechanical feedback control of the control valve internally and automatically adjusts the degree of opening of the valve, steers the temperature Te(t) toward the set temperature Te(set).

Thereafter, in S69, the control unit 70 instructs the drive circuit 71 to change the duty ratio Dt to the one compensated or corrected in the processes of S61–S68 and then leaves the normal control routine RF6 and returns to S52 in the main routine. The drive circuit 71 supplies the drive signal of the compensated or corrected duty ratio Dt to the coil 66 until it receives a new duty ratio Dt changing instruction.

Advantages

This embodiment has the following advantages.

(1) Since the inside/outside air select lever 83 and the air-flow-rate switch 84, which function to signal a change in the cooling load, are electrically connected to the control unit 70, the event of the switching of either is immediately transmitted to the control unit 70. Based on this information, the control unit 70 determines that a significant change in the cooling load Q will occur and can quickly determine or recompute the duty ratio Dt that is associated with the set differential pressure of the control valve CV (see S61–S64 in FIG. 6). Because the switching information is simultaneously transmitted when the lever or the switch is manipulated, the transmission of the switching information is never delayed. Therefore, the determination or recomputation of the set differential pressure never fails to follow up a change in the cooling load Q or a change in the differential pressure ΔP(t) between the two points, thus avoiding the undesirable situation discussed in the beginning of this section. It is therefore possible to accomplish ideal air-conditioning control that quickly renews the set differential pressure when the cooling load changes.

(2) The duty ratio Dt (or the set differential pressure) acquired through the processes in S61–S64 in FIG. 6 is further corrected based on the result of comparison of the temperature Te(t) detected by the temperature sensor 72 with the temperature Te(set) set by the temperature setting unit 82 (see S65–S68 in FIG. 6). This provides the following advantage. Since a change in the temperature inside the vehicle is relatively gentle, the degree of change in the cooling load Q that occurs when the temperature inside the vehicle (or the exit air temperature) changes is smaller than the degree of change in the cooling load Q that occurs when the air flow rate G changes. With respect to a change in the cooling load Q that is due to a change in the air flow rate G, therefore, the duty ratio Dt is changed quickly in the processes of S61–S64 in FIG. 6, whereas for a change in the cooling load Q that is due to a change in the temperature or the like, the duty ratio Dt is changed finely in the processes in S65–S68 in FIG. 6, although the processing needs time for the recurring computation. This allows the temperature inside the vehicle to be maintained at the temperature desired. This combination of two processes of changing the duty ratio Dt that have different characteristics further improves the precision of the air-conditioning control and the response characteristics.

(3) This embodiment carries out feedback control on the discharge capacity of the compressor, and the differential pressure ΔP(t)=PsH−PsL between the two pressure monitoring points P1 and P2 in the refrigerant circulation circuit is the direct control target. Therefore, the discharge capacity can be reduced instantly when necessary, such as during rapid acceleration, by external control without being affected by the thermal load state in the evaporator 33. This allows the engine power to be used only for driving the vehicle.

(4) In the normal mode, the discharge capacity of the compressor is controlled by automatically correcting the duty ratio Dt, which determines the set differential pressure TPD, based on the detected temperature Te(t) and the set temperature Te(set) and by automatically adjusting the degree of opening of the control valve based on the differential pressure ΔP(t). This achieves the purpose of changing the discharge capacity to reduce the difference between the detected temperature and the set temperature to satisfy passenger comfort. That is, this embodiment maintains the room temperature in the normal mode and quickly changes the discharge capacity in the exceptional mode without sacrificing either performance.

Figure 9:
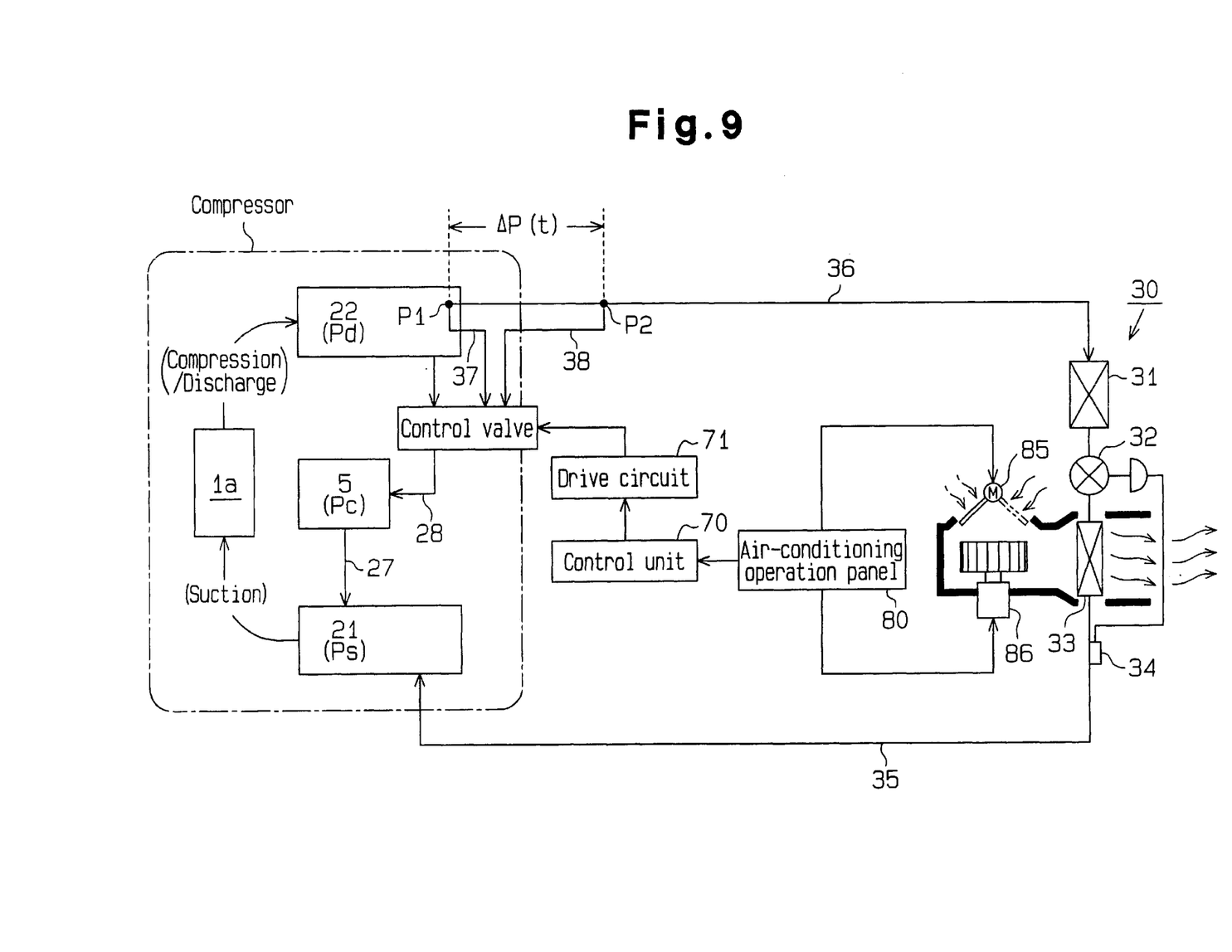
FIG. 9 is a block diagram showing another embodiment of the refrigerant circulation circuit of the air-conditioning system.

It should be apparent to those skilled in the art that the present invention may be embodied in many other specific forms without departing from the spirit or scope of the invention. Particularly, it should be understood that the invention may be embodied in the following forms.
Modifications (1) Although the two pressure monitoring points P1 and P2 are located in the refrigerant circulation circuit in FIG. 1 along the pipe 35 that connects the evaporator 33 to the suction chamber 21 of the compressor, the two pressure monitoring points P1 and P2 may be located along the pipe 36 that connects the discharge chamber 22 of the compressor to the condenser 31, as shown in FIG. 9. In the refrigerant circulation circuit in FIG. 9, the first pressure monitoring point P1 is located in the discharge chamber 22 at the upstream end of the pipe 36, and the second pressure monitoring point P2 is located in the pipe 36, spaced apart from the point P1, by a predetermined distance. The gas pressure PdH at the pressure monitoring point P1 (i.e., the discharge pressure Pd) is applied to the control valve CV through the first passage 37, and the gas pressure PdL at the pressure monitoring point P2 is applied to the control valve CV through the second passage 38. The control valve CV mechanically detects the differential pressure $\Delta P(t)=(PdH-PdL)$ between the two points and performs feedback control of the discharge capacity of the compressor by using the detected differential pressure in the adjustment of the degree of the valve opening. In this case as well, it is possible to detect the flow rate of the refrigerant in the circuit and the discharge capacity of the compressor from the differential pressure $\Delta P(t)$ between the two points. The selection of the two pressure monitoring points is not limited to those illustrated in FIGS. 1 and 9.

(2) The depressurizing unit of the refrigerant circulation circuit may be a fixed restrictor or an orifice tube instead of the expansion valve. When a fixed restrictor or the like is used, an accumulator may be located between the evaporator and the compressor.

It should be noted that the "refrigerant circulation circuit" described in this specification is the circulation circuit that runs through the condenser 31, the depressurizing unit (expansion valve 32), the evaporator 33 and the compressor (the suction chamber 21, the cylinder bores 1a and the discharge chamber 22 in the compressor). In this sense, the cylinder bores 1a that are in the suction stroke or the compression/discharge stroke also become a part of the refrigerant circulation circuit. However, the circuit that circulates the refrigerant via the crank chamber 5 of the compressor is not included in the "refrigerant circulation circuit".

Therefore, the present examples and embodiments are to be considered as illustrative and not restrictive and the invention is not to be limited to the details given herein, but may be modified within the scope of the appended claims.

What is claimed is:

1. An air-conditioning system comprising:
    a refrigerant circulation circuit including a condenser, a depressurizing unit, an evaporator and a variable displacement type compressor;
    two pressure monitoring points located in the refrigerant circulation circuit;
    a differential pressure detector for detecting a differential pressure between the pressures of a refrigerant at the two pressure monitoring points;
    an external information detector, which previously or simultaneously detects a variation in a cooling load and detects other external information;
    a means for determining a set differential pressure between the two pressure monitoring points based on the variation in the cooling load previously or simultaneously detected by the external information detector; and
    a displacement control unit for performing feedback control of the discharge capacity of the compressor such that the differential pressure detected by the differential pressure detector converges to the set differential pressure.

2. The air-conditioning system according to claim 1, wherein the external information detector further includes a temperature sensor for detecting temperature information relating to a compartment and a temperature setting unit for setting a desired temperature; and
    the means for determining a set differential pressure corrects the set differential pressure based on the previously or simultaneously detected variation in the cooling load by comparing the temperature detected by the temperature sensor with the temperature set by the temperature setting unit.

3. The air-conditioning system according to claim 1, wherein the compressor includes cylinder bores, a discharge chamber for containing refrigerant that has been compressed in the cylinder bores and for supplying refrigerant to the condenser, a suction chamber for containing refrigerant returning from the evaporator to conduct refrigerant into the cylinder bores, a crank chamber, and a cam plate, which is housed in the crank chamber, wherein the discharge capacity of the compressor can be altered by adjusting the pressure of the crank chamber, wherein the displacement control unit includes a control valve and a controller for signalling the set differential pressure determined by the means for determining a set differential pressure to the control valve, wherein the control valve adjusts the internal pressure of said crank chamber based on the set differential pressure.

4. The air-conditioning system according to claim 1, wherein the external information detector includes a switch electrically connected to the means for determining a set differential pressure, and the operation of the switch provides the means for determining a set differential pressure with a change in the flow rate of air passing through the evaporator and/or a change in the difference between the enthalpy of intake air entering the evaporator and the enthalpy of air exiting the evaporator.

5. The air-conditioning system according to claim 1, wherein the external information detector includes a mode switching unit, which is electrically connected to the means for determining a set differential pressure, for switching the flow state of air passing through the evaporator between an inner circulation mode and an external circulation mode.

6. The air-conditioning system according to claim 1, wherein the external information detector includes an airflow-rate switch, which is electrically connected to the means for determining a set differential pressure, for switching the flow state of air passing through the evaporator.

7. The air-conditioning system according to claim 3, wherein the control valve has a valve chamber between said discharge chamber and said crank chamber, a pressure sensitive chamber separated into a first pressure chamber communicating with one of said pressure monitoring points and a second pressure chamber communicating with the other one of said pressure monitoring points, an actuation rod so disposed as to extend through said pressure sensitive chamber and said valve chamber, and an electromagnetic actuator section having a movable iron core secured to one end of said actuation rod, whereby said electromagnetic actuator section changes said set differential pressure based on a set-pressure alteration instruction from the controller.

8. The air-conditioning system according to claim 3, further comprising an inlet pipe for connecting an outlet of said evaporator to the suction chamber, wherein a downstream one of the pressure monitoring points is defined in the suction chamber, and an upstream one of the pressure monitoring points is defined in the inlet pipe and is spaced apart from the downstream pressure monitoring point by a predetermined distance.

9. The air-conditioning system according to claim 3, further comprising an outlet pipe for connecting the discharge chamber to an inlet of the condenser, wherein the two pressure monitoring points are defined in an area including the discharge chamber, the condenser and the outlet pipe.

10. The air-conditioning system according to claim 9, wherein an upstream one of the pressure monitoring points is defined in the discharge chamber, and a downstream one of the pressure monitoring points is defined in the outlet pipe and is spaced apart from the upstream pressure monitoring point by a predetermined distance.

11. An air-conditioning apparatus comprising:
 a refrigerant circulation circuit including a condenser, a depressurizing unit, an evaporator and a variable displacement type compressor;
 two pressure monitoring points located in the refrigerant circulation circuit such that a differential pressure exists between the two pressure monitoring points;
 an external information detector that detects a change command in the cooling load applied to the apparatus;
 a controller for determining a set differential pressure between the two pressure monitoring points based on a change command in the cooling load; and
 a control valve that detects the differential pressure and performs feedback control of the discharge capacity of the compressor such that the differential pressure converges to the set differential pressure.

12. The air-conditioning apparatus according to claim 11, wherein the external information detector further includes a temperature sensor for detecting information relating to a compartment temperature and a temperature setting unit for setting a desired temperature in the compartment, and wherein the controller corrects the set differential pressure based on a comparison of the temperature detected by the temperature sensor with the temperature set by the temperature setting unit.

13. The air-conditioning apparatus according to claim 11, wherein the compressor includes cylinder bores, a discharge chamber for containing refrigerant that has been compressed in the cylinder bores and for supplying refrigerant to the condenser, a suction chamber for containing refrigerant returning from the evaporator to conduct refrigerant into the cylinder bores, a crank chamber, and a cam plate, which is housed in the crank chamber, wherein the discharge capacity of the compressor can be altered by adjusting the pressure of the crank chamber, wherein the control valve adjusts the pressure of the crank chamber based on the differential pressure and the set differential pressure.

14. The air-conditioning apparatus according to claim 11, wherein the external information detector includes a switch electrically connected to the controller and the operation of the switch signals a change in a flow rate of air passing through the evaporator or a change in the enthalpy difference between air entering and air exiting the evaporator to the controller.

15. The air-conditioning apparatus according to claim 11, wherein the external information detector includes a mode switching unit, which is electrically connected to the controller, for switching the mode of air passing through the evaporator between an inner circulation mode and an external circulation mode.

16. The air-conditioning apparatus according to claim 11, wherein the external information detector includes an airflow-rate switch, which is electrically connected to the controller, for switching the flow rate of air passing through the evaporator.

17. The air-conditioning apparatus according to claim 13, wherein the control valve has a valve chamber between said discharge chamber and said crank chamber, a pressure sensitive chamber separated into a first pressure chamber communicating with one of said pressure monitoring points and a second pressure chamber communicating with the other one of said pressure monitoring points, an actuation rod so disposed as to extend through said pressure sensitive chamber and said valve chamber, and an electromagnetic actuator section having a movable iron core secured to one end of said actuation rod, whereby said electromagnetic actuator section receives said set differential pressure determined by said controller.

18. The air-conditioning apparatus according to claim 13, further comprising an inlet pipe for connecting an outlet of said evaporator to the suction chamber, wherein a downstream one of the pressure monitoring points is defined in the suction chamber, and an upstream one of the pressure monitoring points is defined in the inlet pipe and is spaced apart from the downstream pressure monitoring point by a predetermined distance.

19. The air-conditioning apparatus according to claim 13, further comprising an outlet pipe for connecting the discharge chamber to an inlet of the condenser, wherein the two pressure monitoring points are defined in an area including the discharge chamber, the condenser and the outlet pipe.

20. The air-conditioning apparatus according to claim 19, wherein an upstream one of the pressure monitoring points is defined in the discharge chamber, and a downstream one of the pressure monitoring points is defined in the outlet pipe and is spaced apart from the upstream pressure monitoring point by a predetermined distance.

* * * * *

UNITED STATES PATENT AND TRADEMARK OFFICE
CERTIFICATE OF CORRECTION

PATENT NO. : 6,385,982 B1
DATED : May 14, 2002
INVENTOR(S) : Ota et al.

It is certified that error appears in the above-identified patent and that said Letters Patent is hereby corrected as shown below:

Column 5,
Line 53, please delete "(pulley)" and insert therefore -- (pulley). --.

Signed and Sealed this

Eleventh Day of February, 2003

JAMES E. ROGAN
*Director of the United States Patent and Trademark Office*